United States Patent [19]

Herwig et al.

[11] Patent Number: 5,073,071
[45] Date of Patent: Dec. 17, 1991

[54] SHAFT STOP BUSHING

[75] Inventors: Wolfgang Herwig, Uslar; Dittmar Kleemann, Friedland; Uwe Kröger, Göttingen; Hans Würth, Ludwigsburg; Martin Mayer, Sersheim; Franz-Josef Meyer, Hildesheim; Werner Rometsch, Gerlingen; Erhard Schenkemeyer, Göttingen; Martin Schneider, Korntal; Jürgen Söllick, Göttingen; Lore Kochendörfer, Kernen-Rommelshausen; Claus Kochendörfer, Kernen-Rommelshausen, all of Fed. Rep. of Germany

[73] Assignee: Robert Bosch GmbH, Stuttgart, Fed. Rep. of Germany

[21] Appl. No.: 490,681

[22] PCT Filed: Sep. 2, 1988

[86] PCT No.: PCT/DE88/00542
§ 371 Date: Mar. 9, 1990
§ 102(e) Date: Mar. 9, 1990

[87] PCT Pub. No.: WO89/02540
PCT Pub. Date: Mar. 23, 1989

[30] Foreign Application Priority Data

Sep. 9, 1987 [DE] Fed. Rep. of Germany ....... 3730200

[51] Int. Cl.$^5$ .............................................. F16B 21/18
[52] U.S. Cl. ..................................... 411/353; 411/517; 403/326
[58] Field of Search .............. 411/353, 352, 517, 530, 411/337, 519, 518, 521, 918, 999; 16/2, DIG. 41; 403/6, 9, 14, 315, 326, DIG. 7, 321, 371

[56] References Cited

U.S. PATENT DOCUMENTS

| 1,867,296 | 7/1932 | Woodruff | 411/517 X |
|---|---|---|---|
| 2,350,311 | 5/1944 | Hall | . |
| 2,950,132 | 8/1960 | Kocsuta | 411/918 X |
| 3,812,756 | 5/1974 | Wenger | 411/353 |
| 4,225,263 | 9/1980 | Asberg | 403/326 |
| 4,405,251 | 9/1983 | Kolchinsky et al. | 411/353 X |
| 4,802,700 | 2/1989 | Stevenson et al. | 411/353 X |

FOREIGN PATENT DOCUMENTS

| 134448 | 3/1985 | European Pat. Off. | . |
|---|---|---|---|
| 2632261 | 2/1984 | Fed. Rep. of Germany | 403/371 |
| 176522 | 9/1961 | Sweden | . |
| 453771 | 2/1988 | Sweden | . |
| 558113 | 6/1977 | U.S.S.R. | 403/326 |
| 543733 | 3/1942 | United Kingdom | 411/530 |
| 738437 | 9/1957 | United Kingdom | 411/353 |
| 1435312 | 5/1976 | United Kingdom | 403/326 |
| 8902540 | 3/1989 | World Int. Prop. O. | 403/326 |

Primary Examiner—Rodney M. Lindsey
Attorney, Agent, or Firm—Michael J. Striker

[57] ABSTRACT

A shaft stop bushing (1) is proposed which is retained in a given position on a shaft (6) by means of a radially resilient stop ring (12). The stop bushing (1) has a longitudinal bore (4) with two circular grooves (7 and 11) of different diameters, between which a funnel-shaped section (10) is formed. The stop ring (12) is inserted in the larger groove (11) so that stops bushing (1) and stop ring (12) form a pre-assembled subassembly (1, 12). The preassembled subassembly (1, 12) can be slid onto the shaft (6) by a simple automatized process without the stop ring (12) touching the shaft (6). The stop ring (12) is retained in its axial position relative to an annular groove (16) of the shaft (6) and is pressed into the annular groove (16) by the stop bushing (1) upon further axial movement of the stop bushing. The entry funnel-shaped section (10) presses the stop ring (12) until, in the assembled state, the smaller-diameter circular groove (7) engages over the stop ring (12).

3 Claims, 1 Drawing Sheet

SHAFT STOP BUSHING

BACKGROUND OF THE INVENTION

The invention relates to a shaft stop bushing having a stop end surface and a longitudinal bore extending from the stop end surface. The bore includes a cylindrical portion and a circular groove, which is adjacent to the cylindrical portion and has a tapering end portion, for receiving a split stop ring mounted on the shaft which is surrounded by the bushing. In such a known shaft stop arrangement, expansion of a circlip used as a stop ring is necessary during mounting onto the shaft, and burrs on circlip and/or stop bushing create difficulties during the assembly if the stop bushing on the shaft has to be drawn over the circlip, which is still somewhat expanded when located in the annular groove of the shaft.

SUMMARY OF THE INVENTION

The object of the invention is to provide a stop ring and/or a shaft stop bushing such that the disadvantages of the known solution are avoided, and an automated assembly of a stop sleeve and a stop ring on the shaft which is suitable for large scale production is made possible.

The object of the invention is achieved by providing a second groove having a diameter larger than the first groove and adjacent to the first groove for receiving a slit stop ring so that the bushing and the stop ring form a subassembly.

It is advantageous here that the slit stop ring can be inserted into the additional larger-diameter circular groove before the stop bushing is mounted onto the shaft and is located in this groove under pretension until the subassembly has been mounted onto the shaft so that the stop ring surrounds the annular groove of the shaft. No scratching and hooking on the shaft can occur during the mounting, because the stop ring does not touch the shaft. Furthermore, the stop ring is already received in the stop bushing when it is pressed into the annular groove of the shaft by the stop bushing, and enters the first all-round groove of the stop bushing in an assembled state. Furthermore, the pre-assembled subassembly and the mounting of the subassembly upon the shaft can be automatized.

It is particularly advantageous to connect the second all-round groove, in which the stop ring is located before and during the mounting of the stop bushing on the shaft, to the first all-round groove by a funnel-shaped section which presses the compressible stop ring into the annular groove of the shaft when the stop bushing is slid further relative to the stop ring until the assembled state is reached in which the stop ring engages into the first all-round annular groove of the stop bushing. A simple auxiliary instrument is sufficient to limit the axial position of the stop ring relative to the annular groove of the shaft.

The present invention both as to its construction so to its mode of operation, together with additional objects and advantages thereof, will be best understood from the following detailed description of the preferred embodiment when read with reference to the accompanying drawing.

DESCRIPTION OF THE PREFERRED EMBODIMENT

Figure 1:
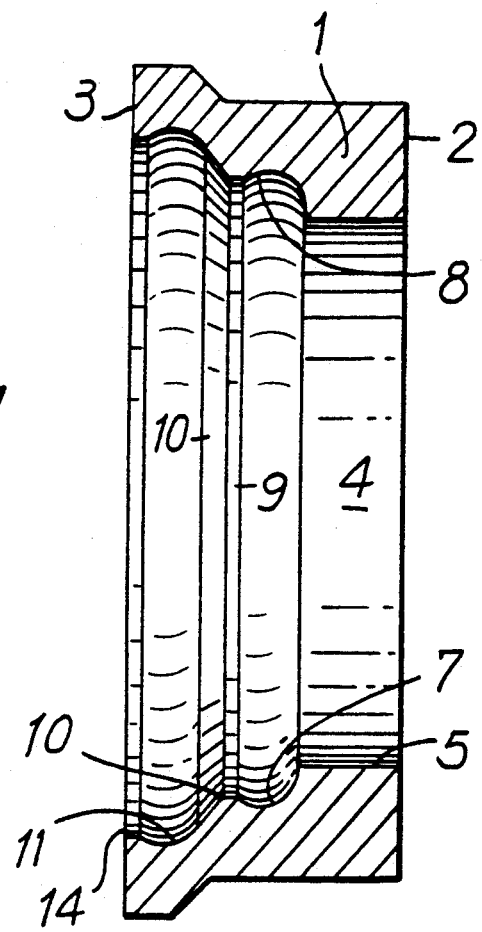
FIG. 1 shows a longitudinal cross-sectional view of a shaft stop bushing according to the invention and FIG. 2 shows the pre-assembled subassembly comprising a stop bushing and a stop ring on a shaft before the stop ring has been pressed into an annular groove, which surrounds of the shaft.
Figure 2:
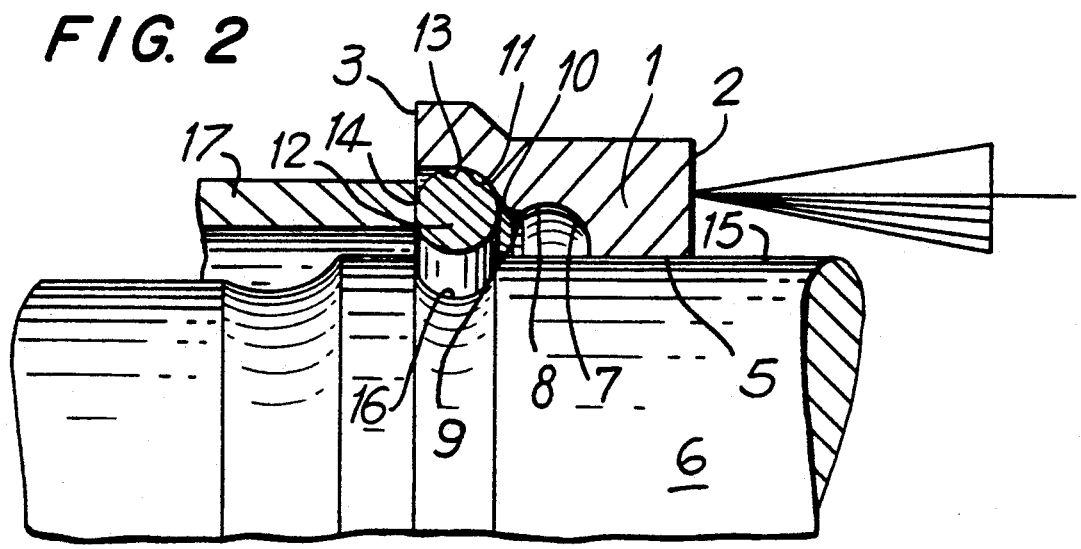

A shaft stop bushing—called stop bushing 1 below—made of metal has two end faces 2 and 3 oriented parallel to each other. The stop bushing 1 is provided with a stepped longitudinal bore 4. The longitudinal bore 4 has a first cylindrical end section 5 which starts from the first end face 2 and serves as a bearing section for the stop bushing 1 on a shaft 6.

The end section 5 is joined by a first circular groove 7 of larger diameter than the end section 5. In longitudinal section the groove 7 has the contour of a circular segment which merges into a tapering first retaining section 8. The first retaining section 8 is adjoined by a narrower, substantially cylindrical, section 9. The section 9 may also be rounded in order to obtain a burr-free transition.

An entry funnel-shaped section 10 starts from the section 9. The entry section 10 ends at a second circular groove 11. The second groove 11 has the same longitudinal cross-section as the first groove 7. Only the diameter of the second all-round groove 11 is greater by somewhat more than the material thickness of a stop ring 12 which retains the stop bushing on the shaft 6 in the assembled state. The second circular groove 11 likewise merges into a tapering second retaining section 13, which in turn adjoins a substantially cylindrical second end section 14. The second end section 14 opens at the second end face 3. The second end section 14 may also be rounded or provided with bevels to facilitate entry of the stop ring 12.

An annular groove 16 is formed in the outer surface 15 of the shaft 6. The stop ring 12 is slitted and radially resilient—a circlip for example. The radius of the circular grooves 7 and 11 and of the annular groove 16 is adapted to the radius of the wire cross-section of the stop ring 12.

The stop ring 12 is inserted into the circular second all-round groove 11 from the second end face 3 in an automated process. The stop bushing 1 and the stop ring 12 thus form a pre-assembled subassembly 1, 12. The subassembly 1, 12 is likewise slid onto the shaft 6 in an automated process, with the end section 5 of the longitudinal bore 4 which serves as bearing section, sliding onto the outer surface 15 of the shaft 6, and the second end face 3 pointing in the sliding direction. The stop ring 12 is not in contact with the shaft 6, for its inside diameter in the expanded state is greater than the diameter of the shaft 6.

When the subassembly 1, 12 has been slid sufficiently onto the shaft 6 for the stop ring 12 to surround the annular groove 16 of the shaft 6, the stop ring 12 abuts against an auxiliary instrument 17. The auxiliary instrument 17 prevents any further movement of the stop ring 12. However, the stop bushing 1 is slid further. The stop bushing 1 is then drawn across the stop ring 12 so that the funnel-shaped introductory section 10 compresses the slitted stop ring 12 radially and at the same time presses it into the annular groove 16 of the shaft 6. The stop bushing 1 is then slid across the stop ring 12 until it snaps resiliently into the first all-round groove 7. The stop ring 12 then retains the stop bushing 1 in its intended position on the shaft 6 and therefore in the assembled state.

While the invention has been illustrated and described as embodied in a shaft stop bushing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A shaft stop bushing assembly, comprising a shaft having an outer surface and an annular groove formed on said outer surface; a slit stop ring located in said annular groove of said shaft; and a bushing having a first end stop surface and a second end surface located opposite to one another and also a longitudinal bore extending between said opposite first and second surfaces, said longitudinal bore including a first circular groove for receiving said slit stop ring to secure said bushing on said shaft and having a portion tapering towards said second end surface and a first diameter, a cylindrical section extending between said first end stop surface and said first circular groove, and a second circular groove extending adjacent to said second end surface and having a second diameter larger than said first diameter for receiving said slit stop ring during mounting of said bushing on said shaft.

2. A shaft stop bushing assembly as set forth in claim 1, wherein said slit stop ring and said bushing form a preassembled subassembly.

3. A shaft stop bushing assembly as set forth in claim 1, wherein said second circular groove has a cross-sectional shape similar to that of said first circular groove, a portion tapering toward said second end surface, and a cylindrical portion extending between said tapering portion of said second circular groove and said second end surface, said longitudinal bore further including a funnel-shaped section extending between said second circular groove and said tapering portion of said first circular groove.

* * * * *